(12) United States Patent
Zhang

(10) Patent No.: US 8,166,411 B2
(45) Date of Patent: Apr. 24, 2012

(54) DATA TRANSFERRING SYSTEM AND METHOD, AND ELECTRONIC DEVICE HAVING THE SAME

(75) Inventor: Yu Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 258 days.

(21) Appl. No.: 12/469,675

(22) Filed: May 20, 2009

(65) Prior Publication Data

US 2010/0169814 A1    Jul. 1, 2010

(30) Foreign Application Priority Data

Dec. 25, 2008    (CN) .......................... 2008 1 0306532

(51) Int. Cl.
*G06F 3/48* (2006.01)
(52) U.S. Cl. ........ 715/769; 715/748; 345/158; 345/173; 345/156
(58) Field of Classification Search .................... 715/769
See application file for complete search history.

(56) References Cited

U.S. PATENT DOCUMENTS

| | | | |
|---|---|---|---|
| 6,375,572 B1 * | 4/2002 | Masuyama et al. ............. 463/43 |
| 6,384,842 B1 * | 5/2002 | DeKoning et al. ............. 715/734 |
| 7,552,397 B2 * | 6/2009 | Holecek et al. ............... 715/788 |
| 2003/0115226 A1 * | 6/2003 | Gopalan ........................ 707/205 |
| 2003/0157960 A1 * | 8/2003 | Kennedy ........................ 455/556 |
| 2004/0179545 A1 * | 9/2004 | Erola et al. .................... 370/449 |
| 2005/0219211 A1 * | 10/2005 | Kotzin et al. ................. 345/158 |
| 2006/0001666 A1 * | 1/2006 | Cake et al. .................... 345/440 |
| 2006/0005156 A1 * | 1/2006 | Korpipaa et al. ............. 717/100 |
| 2006/0017692 A1 * | 1/2006 | Wehrenberg et al. ......... 345/156 |
| 2006/0230030 A1 * | 10/2006 | Volpa et al. ....................... 707/3 |
| 2006/0256074 A1 * | 11/2006 | Krum et al. ................... 345/156 |
| 2008/0039212 A1 * | 2/2008 | Ahlgren et al. ................. 463/46 |
| 2008/0091770 A1 * | 4/2008 | Petras et al. .................. 709/203 |

(Continued)

OTHER PUBLICATIONS

WS_FTP Limited Edition by IPSwitch, FTP client to transfer files between source and target storage devices, released on Dec. 9, 2003.*

(Continued)

*Primary Examiner* — William Bashore
*Assistant Examiner* — Reza Nabi
(74) *Attorney, Agent, or Firm* — Altis Law Group, Inc.

(57) ABSTRACT

A data transferring system includes a reading unit, a display unit, a selecting unit, an orientation sensing unit, an analyzing unit and a transferring unit. The reading unit is configured for reading contents. The display unit is configured for displaying the read contents to allow selection of contents. The selecting unit is configured for selecting contents in response to user inputs. The orientation sensing unit is configured for sensing the orientation of the electronic device. The analyzing unit is configured for determining whether the electronic device is higher than the storage device based upon the sensed orientation. The transferring unit is configured for transferring selected contents from the electronic device to the storage device if the electronic device is higher than the storage device and transferring selected contents from the storage device to the electronic device if the electronic device is lower than the storage device.

19 Claims, 8 Drawing Sheets

U.S. PATENT DOCUMENTS

| | | | | |
|---|---|---|---|---|
| 2008/0163104 A1* | 7/2008 | Haug | | 715/788 |
| 2009/0254294 A1* | 10/2009 | Dutta | | 702/92 |
| 2009/0262075 A1* | 10/2009 | Kimmel et al. | | 345/163 |
| 2009/0280860 A1* | 11/2009 | Dahlke | | 455/556.1 |
| 2009/0300541 A1* | 12/2009 | Nelson | | 715/799 |
| 2010/0188331 A1* | 7/2010 | Wehrenberg et al. | | 345/156 |

OTHER PUBLICATIONS

WS FTP Limited Edition by IPSwitch, FTP client to transfer files between source and target storage devices, released on Dec. 9, 2003, 5 pages.*

* cited by examiner

DATA TRANSFERRING SYSTEM AND METHOD, AND ELECTRONIC DEVICE HAVING THE SAME

BACKGROUND

1. Technical Field

The present disclosure relates to a data transferring system and method, and an electronic device having the same.

2. Description of Related Art

Current data transferring systems typically need to be operated under a traditional user interface, such as a mouse device or a touch screen. This process is tedious and boring.

Therefore, what is desired is a data transferring system and method, and an electronic device having the same that can overcome the above described problem.

DETAILED DESCRIPTION

Figure 1:
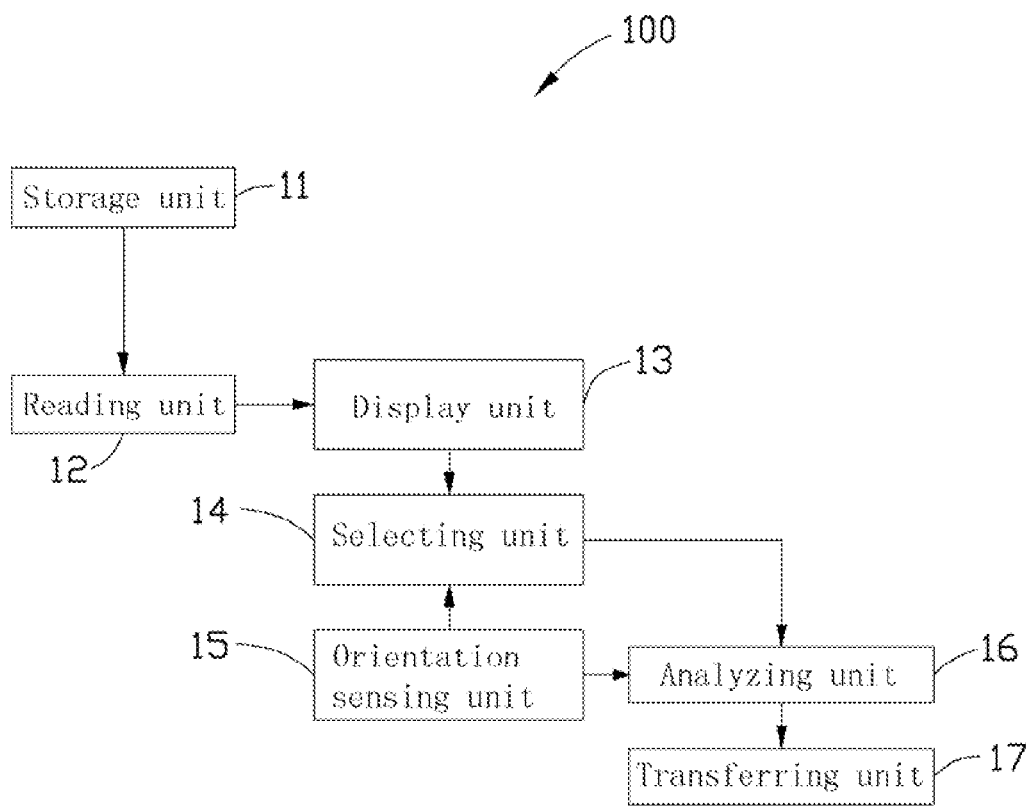
FIG. 1 is a functional block diagram of a data transferring system in accordance with an exemplary embodiment.
Figure 2:
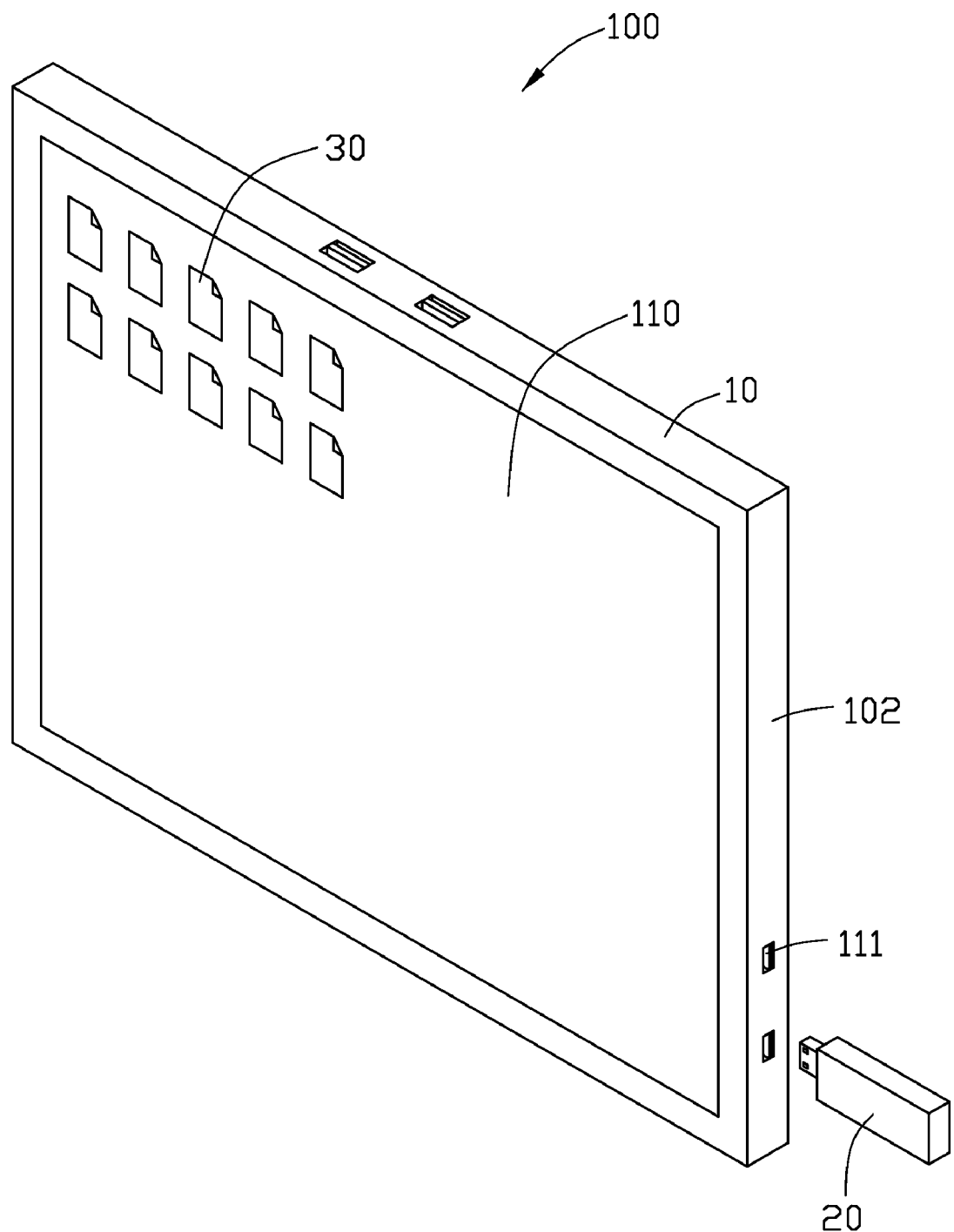
FIG. 2 is an isometric, schematic view of an electronic device and a storage device, which are in a first operation state, according to an exemplary embodiment.

Referring to FIGS. 1-2, a data transferring system 100 in accordance with an exemplary embodiment is illustrated. The data transferring system 100 is configured for controlling data transmission between an electronic device 10, such as a personal digital assistant (PDA) or a mobile phone, and a storage device 20 such as a universal serial bus (USB) drive. In this embodiment, the electronic device 10 is a PDA, and the storage device 20 is a USB drive. The PDA 10 includes a storage unit 11, a user interface (not labeled), an LCD touch screen 110, a frame 102, and a number of ports 111. The LCD touch screen 110 is surrounded by the frame 102 and is configured for receiving user inputs and displaying information for users. The ports 111 are defined in the frame 102 and are configured for electrically connecting the PDA 10 to the storage device 20.

It should be mentioned that the electronic device 10 is not limited by this embodiment, in other embodiments, instead of the touch screen, the electronic device 10 can also use a mouse or a keypad for receiving user inputs and a display panel for displaying information for the users.

The data transferring system 100 includes a reading unit 12, a display unit 13, a selecting unit 14, an orientation sensing unit 15, an analyzing unit 16, and a transferring unit 17.

The reading unit 12 is configured for reading contents of the storage unit 11 of the electronic device 10 or of the storage device 20. The display unit 13 is configured for displaying the contents on the user interface to facilitate input selection of contents. The selecting unit 14 is configured for selecting contents in response to user inputs via the user interface. The orientation sensing unit 15 is configured for sensing the orientation of the electronic device 10. The analyzing unit 16 is configured for determining whether the electronic device 10 is higher than the storage device 20 based upon the sensed orientation of the orientation sensing unit 15. The transferring unit 17 is configured for transferring selected contents from the electronic device 10 to the storage device 20 if the electronic device 10 is higher than the storage device 20 and transferring the selected contents from the storage device 20 to the electronic device 10 if the electronic device 10 is lower than the storage device 20.

Figure 3:
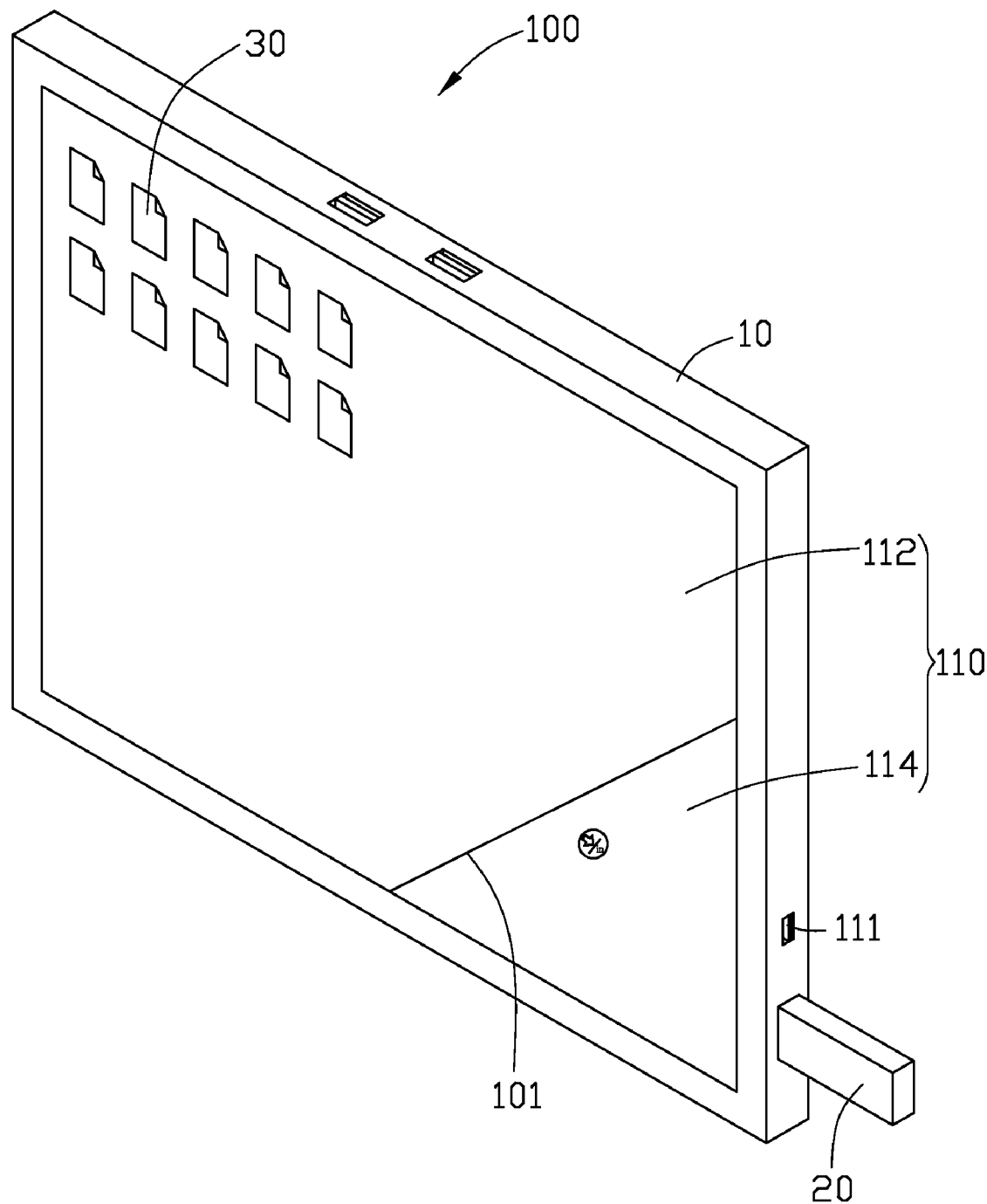
FIG. 3 is an isometric, schematic view of the electronic device and the storage device, which are in a second operation state, according to an exemplary embodiment.
Figure 4:
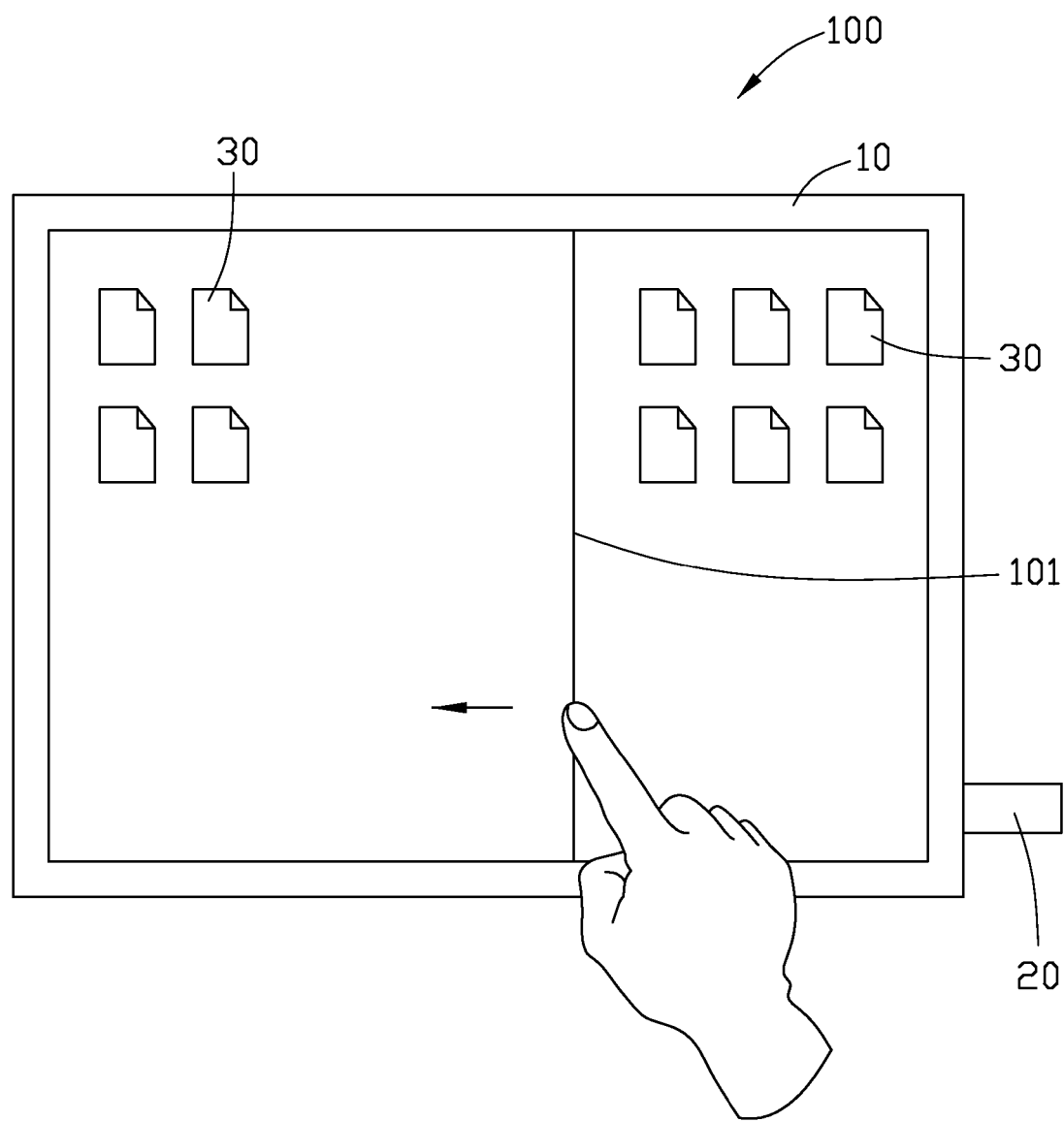
FIG. 4 is an isometric, schematic view of the electronic device and the storage device, which are in a third operation state, according to an exemplary embodiment.

Also referring to FIG. 3, in this embodiment, the display unit 13 is the LCD touch screen 110. When the storage device 20 is electrically connected to one of the ports 111, the display unit 13 generates a host window 112 for displaying the contents stored in the storage unit of the electronic device 10 and a destination window 114 for displaying contents stored in the storage device 20. The host window 112 and the destination window 114 are divided by a partition line 101. The destination window 114 is adjacent to the storage device 20. In this embodiment, the location of the destination window 114 on the display unit 13 corresponds with the location of the port 111 being accessed by the storage device 20. For example, if the storage device 20 is plugged into at the right, bottom corner of the touch screen 110, the destination window 114 is displayed on the right, bottom corner of the touch screen 110 and the host window 112 is displayed on the left, top portion of the touch screen 110. Sizes of the host window 112 and the destination window 114 can be adjusted by moving, e.g., dragging, the partition line 101 (as shown in FIG. 4).

Figure 5:
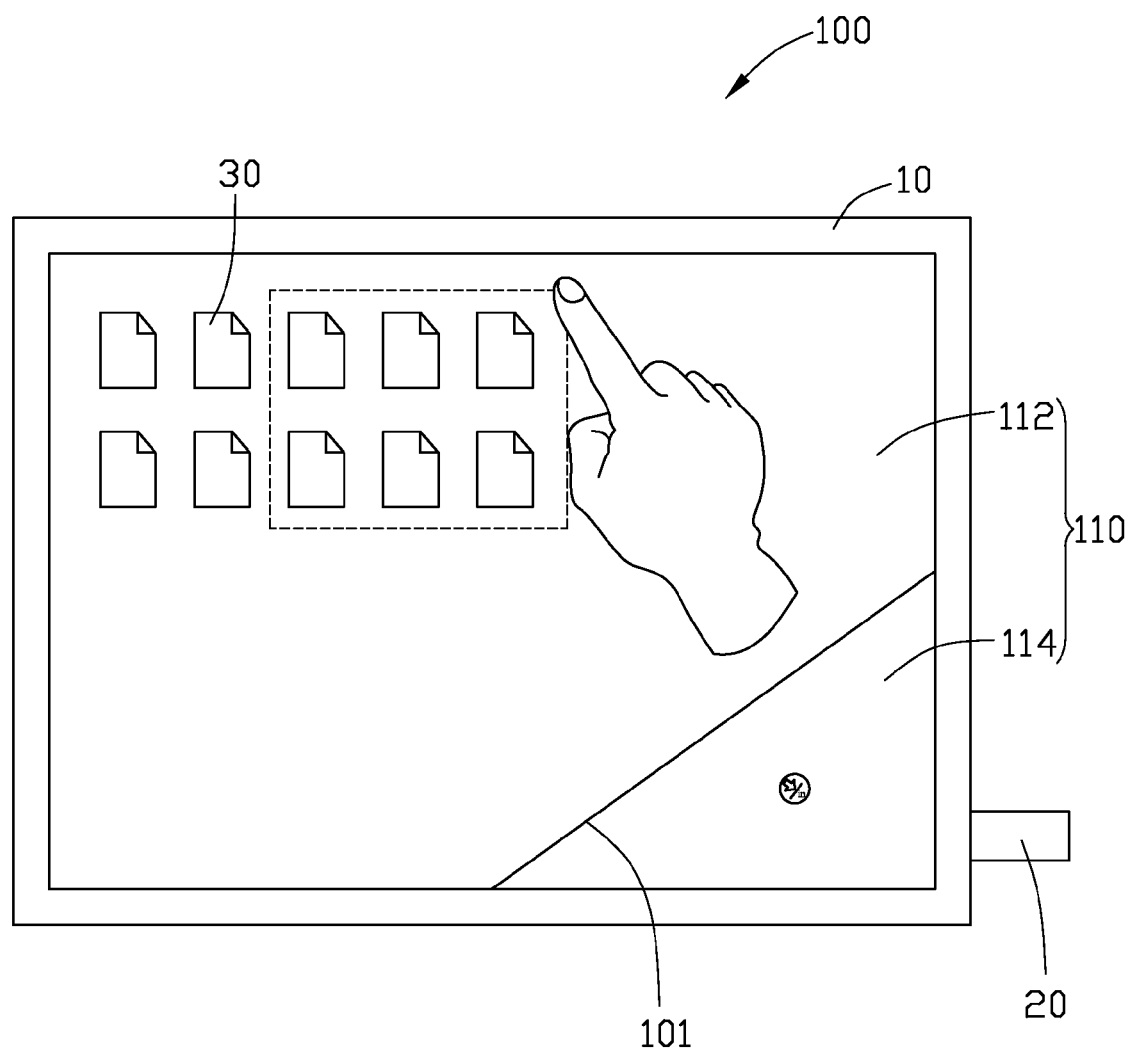
FIG. 5 is an isometric, schematic view of the electronic device and the storage device, which are in a fourth operation state, according to an exemplary embodiment.

Referring to FIG. 5, the selecting unit 14 is configured for selecting the contents 30 displayed in the host window 112 or the destination window 114 in response to user inputs. In this embodiment, because the display unit 13 is a LCD touch screen 110, the selecting unit 14 can select the contents 30 needed to be transmitted in response to a user input via a stylus or by touch.

Figure 6:
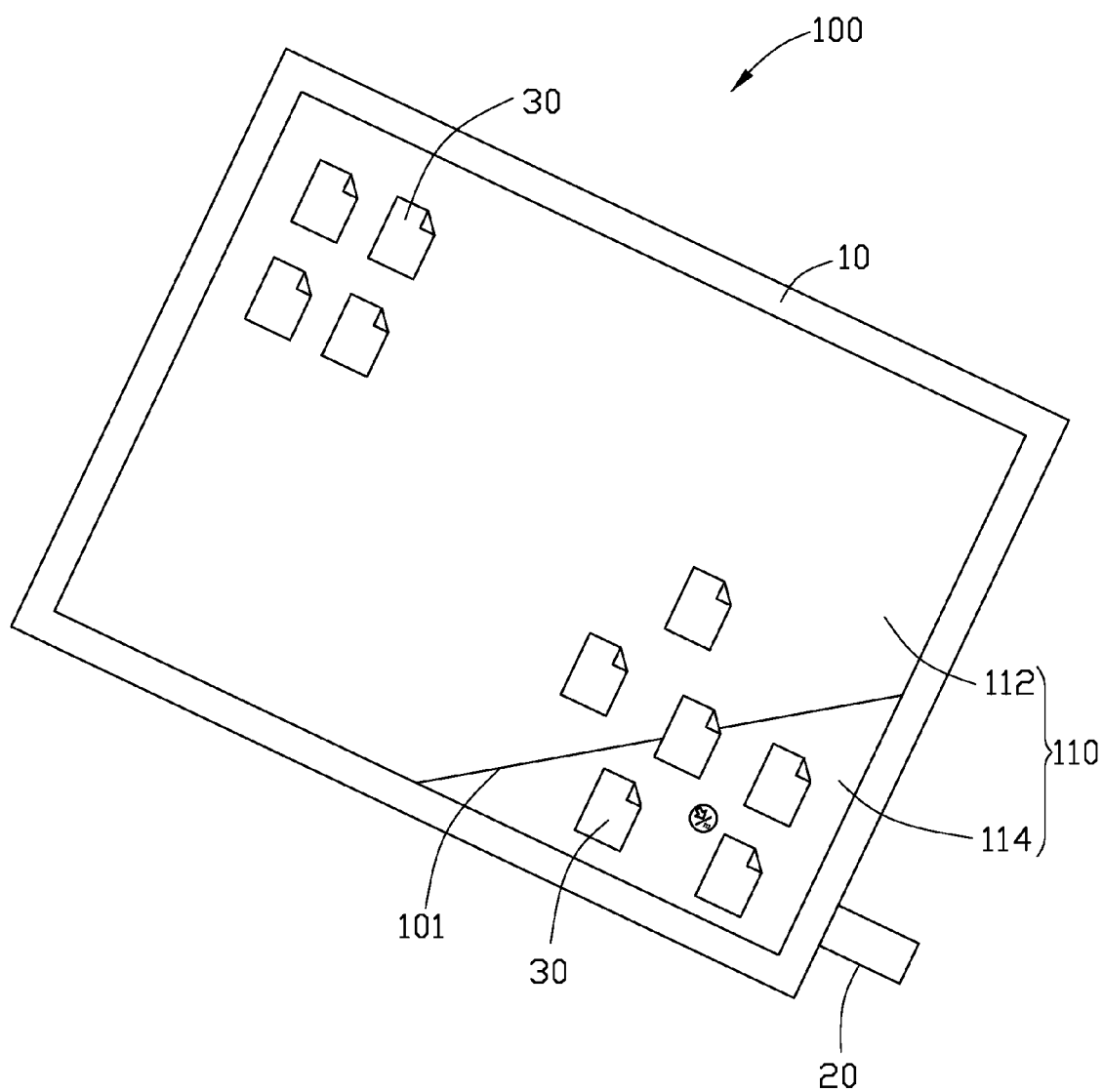
FIG. 6 is an isometric, schematic view of the electronic device and the storage device, which are in a fifth operation state, according to an exemplary embodiment.

Also referring to FIG. 6, the orientation sensing unit 15 is an accelerometer, and is accommodated in the electronic device 10. In use, for example, the selecting unit 14 selects contents displayed in the host window 112. Then, if the electronic device 10 is tilted so that the storage device 20 is closer to the ground than the electronic device 10, the orientation sensing unit 15 detects the tilted orientation.

The analyzing unit 16 is electrically connected to the selecting unit 14, and the orientation unit 15. In this embodiment, if the selecting unit 14 has selected the contents 30 from the LCD touch screen 110, and the electronic device 10 is tilted towards the lower right corner, the analyzing unit 16 determines the electronic device 10 is higher than the storage device 20 based upon the sensed orientation sensed by the orientation unit 15, and sends a transferring command to the transferring unit 17. The transferring command transmits the contents in the host window 112 to the destination window 114. In other words, the transferring command is transferring contents from the electronic device 10 to the storage device 20.

Figure 7:
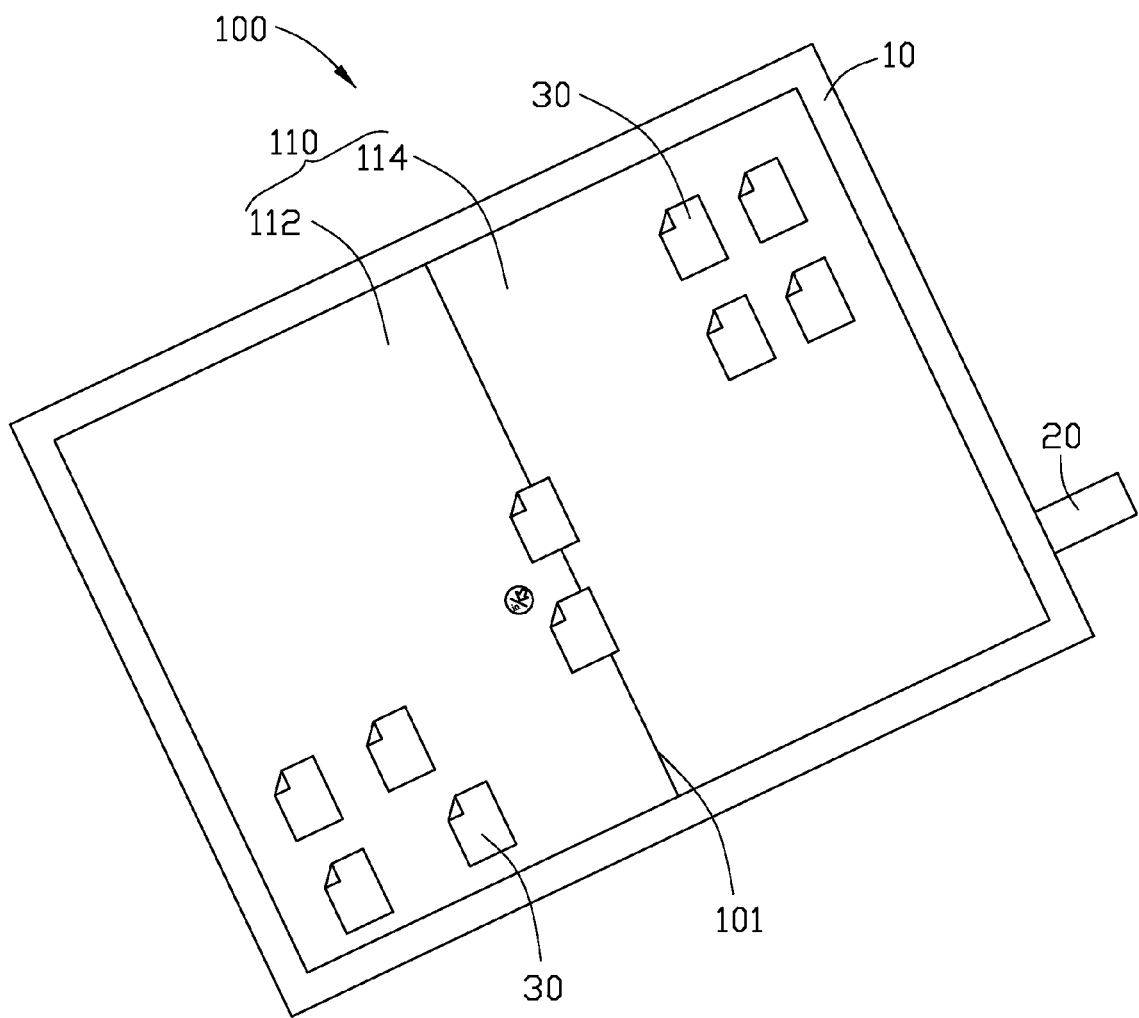
FIG. 7 is an isometric, schematic view of the electronic device and the storage device, which are in a sixth operation state, according to an exemplary embodiment.

Referring to FIG. 7, alternatively, the selecting unit 14 can also select the contents 30 from the destination window 114, when user tilts the electronic device 10 towards to lower left corner, thereby, the analyzing unit 16 determines the electronic device 10 is lower than the storage device 20 based upon the orientation sensed by the orientation unit 15, and sends a transferring command to the transferring unit 17. The transferring command transmits the contents from the destination window 114 to the host window 112. In other words, the transferring command transmits the contents 30 from the storage device 20 to the electronic device 10.

The analyzing unit 16 can also compare if the free space of the storage device 20 is larger than the size of the selected contents, if yes, the analyzing unit 16 will send a transferring command to the transferring unit 17 to transmit the selected contents 30, accordance to the transferring command.

The analyzing unit 16 can further determine if the transferring unit 17 has completed the data transfer, if yes, the analyzing unit 16 will send a stop transferring command to the transferring unit 17 to stop.

Figure 8:
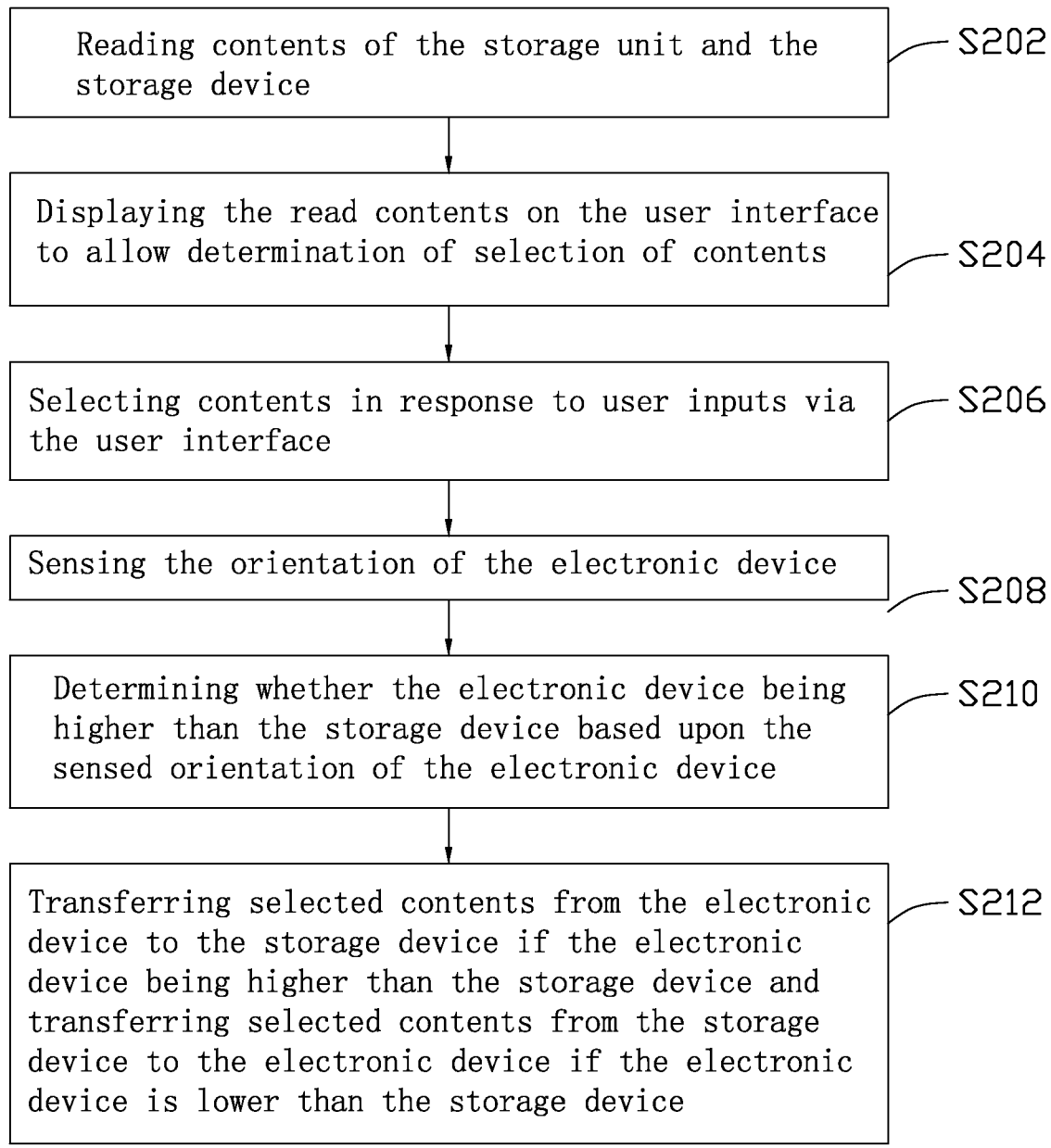
FIG. 8 is a flowchart of a data transferring method, according to an exemplary embodiment.

Referring to FIG. 8, a flowchart of a data transferring method is shown. The method for controlling data transmission between the electronic device 10 and the storage device 20, the electronic device 10 including a storage unit 11 and a user interface, the data transferring method includes: reading contents of the storage unit 11 and the storage device 20; displaying the read contents of on the user interface to allow determination of selection of contents; selecting contents in response to user inputs via the user interface; sensing the orientation of the electronic device 10; determining whether the electronic device 10 is higher than the storage device 20 based upon the sensed orientation of the electronic device 10; and transferring selected contents from the electronic device 10 to the storage device 20 if the electronic device 10 is higher than the storage device 20 and transferring selected contents from the storage device 20 to the electronic device 10 if the electronic device 10 is lower than the storage device 20.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A data transferring system for controlling data transfer between an electronic device and a storage device, the electronic device comprising a storage unit and a user interface, the data transferring system comprising:
   a reading unit configured for reading contents of the storage unit and the storage device plugged into the electronic device;
   a selecting unit configured for selecting contents of the storage unit and the storage device in response to user inputs via the user interface;
   an orientation sensing unit configured for sensing a titled orientation of the electronic device;
   an analyzing unit configured for determining to perform a data transfer between the electronic device and the storage device when the orientation sensing unit senses the titled orientation of the electronic device, and further for determining whether the electronic device is higher than the storage device based upon the sensed titled orientation of the electronic device wherein movement of the storage device is in sync with the electronic device; and
   a transferring unit configured for transferring selected contents from the electronic device to the storage device if the electronic device is higher than the storage device and transferring selected contents from the storage device to the electronic device if the electronic device is lower than the storage device.

2. The data transferring system as claimed in claim 1, further comprising a display unit configured for displaying the read contents.

3. The data transferring system as claimed in claim 2, wherein the display unit is an LCD touch screen, and comprises a frame, a displaying area surrounded by the frame, and a plurality of ports mounted in the frame.

4. The data transferring system as claimed in claim 3, wherein when the storage device accesses the port, the display unit generates a host window configured for displaying contents in the storage unit of the electronic device and a destination window configured for displaying contents in the storage device, the host window and the destination window are divided by a partition line, and the sizes of the host window and the destination window can be adjusted by dragging the partition line.

5. The data transferring system as claimed in claim 4, wherein the location of the destination window shown on the displaying area corresponds with the location of the port being accessed by the storage device.

6. The data transferring system as claimed in claim 1, wherein the analyzing unit is also configured for comparing whether the free space of the storage device is larger than the size of the selected contents, if yes, the analyzing unit sends a transferring command to the transferring unit to transmit the selected contents.

7. The data transferring system as claimed in claim 1, wherein the orientation sensing unit is an accelerometer, and is accommodated in the electronic device.

8. The data transferring system as claimed in claim 1, wherein the electronic device is a Personal Digital Assistant (PDA) or a mobile phone.

9. The data transferring system as claimed in claim 1, wherein if the electronic device is tilted towards a first side thereof plugged into the storage device, the analyzing unit determines the electronic device is higher than the storage device based upon the sensed orientation sensed by the orientation unit, and if the electronic device is tilted towards a second side opposite to the first side thereof, the analyzing unit determines the electronic device is lower than the storage device based upon the sensed orientation sensed by the orientation unit.

10. An electronic device comprising:
   a storage unit;
   a user interface; and a date transferring system comprising:
   a reading unit configured for reading contents of the storage unit and a storage device plugged into the electronic device;
   a display unit configured for displaying the read contents on the user interface to allow selection of the read contents;
   a selecting unit configured for selecting contents in response to user inputs via the user interface;
   an orientation sensing unit configured for sensing a titled orientation of the electronic device;
   an analyzing unit configured for determining to perform a data transfer between the electronic device and the storage device when the orientation sensing unit senses the titled orientation of the electronic device, and further for determining whether the electronic device is higher than the storage device based upon the sensed orientation of the electronic device wherein movement of the storage device is in sync with the electronic device; and a transferring unit configured for transferring selected contents from the storage unit to the storage device if the electronic device is higher than the storage device and transferring selected contents from the storage device to the electronic device if the electronic device is lower than the storage device.

11. The electronic device as claimed in claim 10, wherein the display unit is an LCD touch screen, and comprises a frame, a displaying area surrounded by the frame, and a plurality of ports mounted in the frame.

12. The electronic device as claimed in claim 11, wherein when the storage device accesses the port, the display unit generates a host window configured for displaying contents in the storage unit and a destination window configured for displaying contents in the storage device, the host window and the destination window are divided by a partition line, and the sizes of the host window and the destination window can be adjusted by dragging the partition line.

13. The electronic device as claimed in claim 12, wherein the location of the destination window shown on the displaying area corresponds with the location of the port being accessed by the storage device.

14. The electronic device as claimed in claim 10, wherein the analyzing unit is also configured for comparing whether the free space of the storage device is larger than the size of the selected contents, if yes, the analyzing unit sends a transferring command to the transferring unit to transmit the selected contents.

15. The electronic device as claimed in claim 10, wherein the orientation sensing unit is an accelerometer, and is accommodated in the electronic device.

16. The electronic device as claimed in claim 10, wherein the electronic device is a Personal Digital Assistants (PDA) or a mobile phone.

17. The electronic device as claimed in claim 10, wherein if the electronic device is tilted towards a first side thereof plugged into the storage device, the analyzing unit determines the electronic device is higher than the storage device based upon the sensed orientation sensed by the orientation unit, and if the electronic device is tilted towards a second side opposite to the first side thereof, the analyzing unit determines the electronic device is lower than the storage device based upon the sensed orientation sensed by the orientation unit.

18. A data transferring method for controlling data transmission between an electronic device and a storage device, the electronic device comprising a storage unit and a user interface, the data transferring method comprising:
    reading contents of the storage unit and the storage device plugged into the electronic device;
    displaying the read contents on the user interface to allow determination of selection of contents;
    selecting contents in response to user inputs via the user interface; sensing a titled orientation of the electronic device; determining to perform a data transfer between the electronic device and the storage device and whether the electronic device is higher than the storage device based upon the sensed titled orientation of the electronic device wherein movement of the storage device is in sync with the electronic device; and
    transferring selected contents from the electronic device to the storage device if the electronic device is higher than the storage device and transferring selected contents from the storage device to the electronic device if the electronic device is lower than the storage device.

19. The data transferring method as claimed in claim 18, wherein if the electronic device is tilted towards a first side thereof plugged into the storage device, the electronic device is higher than the storage device based upon the sensed orientation, and if the electronic device is tilted towards a second side opposite to the first side thereof, the electronic device is lower than the storage device based upon the sensed orientation.

* * * * *